United States Patent [19]

Gaulke et al.

[11] Patent Number: 4,482,917
[45] Date of Patent: Nov. 13, 1984

[54] METHOD FOR A REPRODUCTION OF COLORED MASTERS IN FOUR-COLOR PRINTING USING COLOR REDUCTION

[75] Inventors: Werner Gaulke, Kiel; Eggert Jung, Schoenberg, both of Fed. Rep. of Germany

[73] Assignee: Dr. Ing. Rudolf Hell GmbH, Fed. Rep. of Germany

[21] Appl. No.: 356,449

[22] Filed: Mar. 9, 1982

[30] Foreign Application Priority Data

Mar. 11, 1981 [DE] Fed. Rep. of Germany ....... 3109190

[51] Int. Cl.³ .............................................. G03F 3/00
[52] U.S. Cl. ......................................... 358/80; 358/75
[58] Field of Search ............... 358/75, 79, 80; 355/32, 355/88

[56] References Cited

U.S. PATENT DOCUMENTS

| | | |
|---|---|---|
| 2,848,528 | 8/1958 | Woll . |
| 2,939,908 | 6/1960 | Shapiro . |
| 2,947,805 | 8/1960 | Moe . |
| 2,993,087 | 7/1961 | Hell . |
| 3,582,549 | 6/1971 | Hell et al. . |
| 3,608,033 | 9/1971 | Hall . |
| 3,725,574 | 4/1973 | Gast . |
| 4,335,398 | 6/1982 | Yamada .................................. 358/80 |
| 4,346,402 | 8/1982 | Pugsley ................................. 358/80 |

FOREIGN PATENT DOCUMENTS

| | | |
|---|---|---|
| 1597773 | 5/1970 | Fed. Rep. of Germany . |
| 2161038 | 6/1973 | Fed. Rep. of Germany . |
| 2107738 | 1/1976 | Fed. Rep. of Germany . |
| 2725093 | 12/1978 | Fed. Rep. of Germany . |
| 2810225 | 9/1979 | Fed. Rep. of Germany . |
| 1407487 | 9/1975 | United Kingdom . |
| 2016238 | 9/1979 | United Kingdom . |

OTHER PUBLICATIONS

Principles Of Color Reproduction, By Yule, John Wiley & Sons, Inc., pp. 282–304.
New Developments And Applications Of Photography In Printing, By Pugsley And Wood, Apr. 1975, pp. 33:1 to 33:3.

Primary Examiner—Tommy P. Chin
Attorney, Agent, or Firm—Hill, Van Santen, Steadman & Simpson

[57] ABSTRACT

A method for reproducing colored masters in four-color printing where a color reduction or removal (UCR) which differs between the gray area and the chromatic area of the master is utilized in the production of the color separations. In the gray area, a color reduction is done in which a gray balance is produced between the three chromatic printing ink signals Y, M and C. In the chromatic area of the master, a color reduction matched to the respective maximum mean and minimum value of the three chromatic printing ink signals Y, M and C is accomplished.

9 Claims, 2 Drawing Figures

METHOD FOR A REPRODUCTION OF COLORED MASTERS IN FOUR-COLOR PRINTING USING COLOR REDUCTION

BACKGROUND OF THE INVENTION

1. Field of the Invention

The invention relates in general to a method for reproducing colored masters in printing process using color reduction.

2. Description of the Prior Art

In the printing technology, printing in other words, with four inks is usually employed in the reproduction of colored masters, in other words, for color separation for the printing inks, yellow magenta, cyan and black. If one had an ideal printing process and ideal inks and ideal printing materials, it would be possible to use only three inks having colors yellow, magenta, and cyan so as to print the color black. In practice, however, lower contrast reproductions result in three color printing specially when wet-on-wet printing is utilized. For this reason, generally four-color printing are utilized using the additional fourth black color separation whereby a so-called color reduction or removal can be carried out for the other printing inks. In practice, this method is referred to as "UCR" which means "Under Color Removal". The reproduction-technical interrelationships as well as the method of obtaining color removal are described in the following articles. Kodak, Die Reproduktion, Zeitschrift für den ReproFachmann, Vol. 13, Kodak AG, Stuttgart-Wangen, Printed in Germany, MA 5584-0869-G, Pages 14–26. This Kodak reference corresponds to Chapter 11, page 282-305 Four-Color Printing and the Black Printer of the book, Principles of Color Reproduction, J. A. C. Yule, Kodak Research Laboratories Rechester, N.Y., John Wiley & Sons, Inc. New York, London, Sydney. Reprint from the Polygraph-Jahrbuch 1967, published at Frankfurt/Main, Article "Farbrücknahme auf elektronischem Wege" by Eberhard Hennig.

Since less printing ink needs to be printed with color reduction, advantages are obtained in wet-on-wet printing and the ink consumption is lower than without color reduction. Additional advantages of color reduction are higher gray balance, printing stability and better edge sharpness because neutral transitions are then essentially printed only with the black. Printing ink in contrast to printing without color reduction errors which occur when the prints of the color separation are out of register thus have less of an effect on the sharpness impression. Since less color need to be printed in chromatic inks reduction advantages are obtained in wet-on-wet printing and the ink consumption is lower.

SUMMARY OF THE INVENTION

It is an object of the present invention to further improve the reproduction quality in four color printing by using modified color reduction.

The invention provides for the method of reproduction of colored masters in four-color printing in which the master is trichromatically scanned and the measured color values of red, green and blue thus obtained are converted into printing ink signals of yellow (Y), magenta (M), Cyan (C) and black (K) which serve for the production of the color separations employed for the color printing and wherein a color reduction is accomplished wherein different evaluation is made in the color reduction between the gray area and chromatic area of the master and a color reduction is done in the gray area in which a gray balance associated with the three printing ink signals Y, M C is taken into consideration and that a color reduction is accomplished in the chromatic area of the master which is matched to the respective maximum, mean or minimum value of the three printing ink signals Y, M and C.

Other objects, features and advantages of the invention will be readily apparent from the following description of certain preferred embodiments thereof taken in conjunction with the accompanying drawing although variations and modifications may be effected without departing from the spirit and scope of the noval concepts of the disclosure and in which:

DESCRIPTION OF THE PREFERRED EMBODIMENTS

Figure 1:
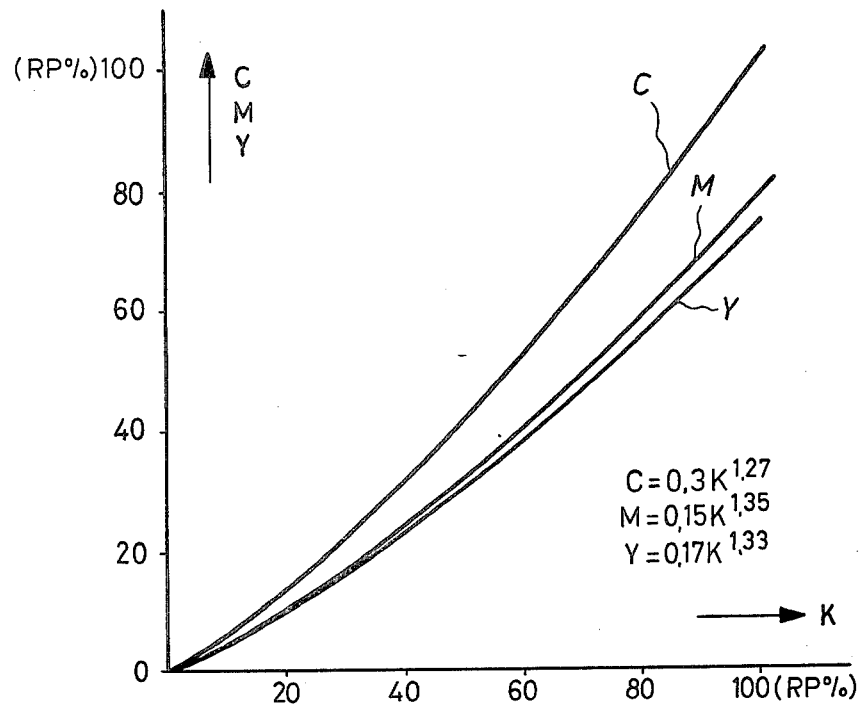
FIG. 1 comprises a plot illustrating the color reduction.

FIG. 1 comprises a diagram for determining the percentile black level. In modern printing technology, colored originals are trichromatically opto-electrically scanned by means of scanners whereby color measured value signals R, G and B are obtained and which after being digitized are further subjected to additional processing for producing the color separation signals yellow, magenta, cyan and black which are referred herein as Y for yellow, M for magenta, C for Cyan and K for black. Such scanning devices are described in German OS No. 28 10 225 which corresponds to British L.P. No. 2,016,238. In addition to the scanner, in this German and British patent, a device comprising an image signal processing means and consists of a control unit a working memory and an output memory in which the finally determined color separation signals are obtained for the producing the color separations. The actual production of the color separation is accomplished with the apparatus described in this patent where the output memory is followed by a recording unit which comprises either an exposure unit which produces the color separations in the form of exposed photographic film engraved printing forms or other matrices suitable for color printing. Such devices are disclosed for example in German LP No. 21 07 738 which corresponds to U.S. Pat. No. 3,725,574, in U.S. Pat. No. 3,582,549, in German OS No. 21 61 038 which corresponds to U.K. Pat. No. 1,407,487, in German AS No. 27 25 093 and in German LP No. 15 97 773 which corresponds to U.S. Pat. No. 3,608,033. The disclosure of all of these referenced German U.K. and U.S. patent documents are hereby incorporated by a reference in this application. Since these recording methods are known and commercially available for those skilled in the art and the control of intermediately recording unit results on the basis of stored color separation signals greater details of these recording methods are not given herein but reference may be made to the referenced patent documents.

The present invention proceeds beyond the known color reduction method. In the present invention, a modification of the color reduction is discriminated between gray area and color area. Gray area means the area around the gray line within the color space whereby the gray line specifies the neutral densities between black and white. The chromatic area is the area of the color space which lies around the gray line. As mentioned above, the present invention starts with a distinction between the gray area and the chromatic area. The color reduction is differently calculated in the two areas. In the gray area, the color removal is carried out according to the following equations:

$$Y_g = Y_3(1-S_g)$$

$$M_g = M_3(1-S_g)$$

$$C_g = C_3(1-S_g)$$

Where the index "g" represents the printing ink signals after color removal, the index "3" represents the printing ink signals before the color removal and "$S_g$" specifies the degree of the color reduction in the gray area. The values $S_g$ vary between 0 for no color removal to 1 for maximum color removal in the gray area.

The printing ink signal for the printing ink black is obtained from the printing ink signal for the printing ink cyan ($C_3$) before the color removal, whereby the gray balance must be taken into account. FIG. 1 illustrates the relationship between the combinations of the three printing inks Y, M and C which are required in the overprint so as to obtain a gray tone of equal brightness as the printing ink black by itself. This interrelationship depends on the use of printing inks and printing process and is measurationally determined. In FIG. 1, three functions are illustrated by way of example. Since the printing ink cyan predominates in gray tones in comparison to the two other chromatic printing inks, it determines the dot size coverage for the black which is to create a gray tone of equal brightness. In the diagram illustrated in FIG. 1, it can be determined by means of the inverse function that $$C = f(K)$$

i.e.

$$K = f^{-1}(C)$$

Thus, $K_g = S_g f^{-1}(C_3)$ can be derived for the black and the gray area.

In the chromatic area, the color reduction is accomplished differently depending upon whether the printing ink signal is the minimum, mean or maximum of the three signals. The equations then are $$D_{4min} = a_{min} D_{3min}$$

$$D_{4mean} = a_{mean} D_{3mean}$$

$$D_{4max} = a_{max} D_{4max}$$

$$K_f = a_K D_{3min}$$

whereby $D_{3,min}$, $D_{3,mean}$ and $D_{3,max}$ are the minimum, mean and maximum signals of a color triple Y, M, C before the color reduction and $a_{min}$, $a_{mean}$, $a_{max}$ and $a_K$ represent evaluation factors and $K_f$ is the printing ink signal for color separation black separation and $D_{4,min}$, $D_{4,mean}$ and $D_{4,max}$ represent the new printing ink signals after color reduction.

The evaluation factors $a_K$, $a_{min}$, $a_{mean}$ and $a_{max}$ are calculated according to the following equations:

$$a_k = b_1 S_f$$
$$a_{max} = 1$$
$$a_{mean} = 1 - S_f[b_2 \{\alpha_3 (D_{3,max} - D_{3,mean})\}_1]$$
$$a_{min} = 1 - S_f[b_3 \{\alpha_1 (D_{3,max} - D_{3,min})\}_1 + b_4 \{\alpha_2 (D_{3,mean} - D_{3,min})\}_1]$$

$S_f$ is the measurement for the color reduction in the chromatic area and lies between $S_f = 0$ for no color reduction and $S_f = 1$ for maximum color reduction.

$\alpha_1$, $\alpha_2$, and $\alpha_3$ are evaluation factors for the differences between the minimum, mean and maximum signals. They determine the size of the transition range for a continuous transition between the evaluation factors of the individual signals. The $\{\ldots\}_1$ represents that the value of the brackets is limited to 1. The equations are selected such that no discontinuous changes occur in the evaluation factors $a_{max}$, $a_{mean}$ and $a_{min}$ for any color triplet changement.

In the present example, the factors $b_1$ through $b_2$ are selected as follows:

$$b_1 = 0.9$$

$$b_2 = 0.3 - b_3$$

$$b_4 = 0.4$$

Here the factors $b_1$ through $b_4$ can also assume other values depending upon the degree of the respective reduction.

It is assumed that the printing ink signal for yellow is the minimum signal, that the signal for cyan is the mean signal and the signal for magenta is the maximum signal. In a specific smooth transition in the color space, the signal for yellow, for example, will increase and approximates the size of the cyan signal, in other words, of the mean signal. This has the effect that the evaluation factors $a_{min}$ will approach the factor $a_{mean}$. When the cyan and yellow signals are equal, than the factors $a_{mean}$ and $a_{min}$ will also have equal size and $$a_{mean} = a_{min} = 1 - S_f[0.3\{\alpha_3(D_{3\ max} - D_{3\ mean})\}_1]$$

A continuous transition of the color reduction between the two listed calculation modes will occur in the transition area between the gray area and the colored or chromatic area. This is achieved with a gray weighting signal Δ which depends on the distance of the respective color triplet from the gray line and is calculated according to the following equation:

$$\Delta = (B.\delta)_1,$$

whereby B determines the transition area between the gray area and the chromatic area and δ specifies the distance of the respective color locus from the gray line and $(B.\delta)_1$ represents the limitation of the bracketed value to "1" where the calculation is carried out according to the following equation $$\delta = \sqrt{(f^{-1}(C) - f^{-1}(M))^2 + (f^{-1}(M) - f^{-1}(Y))^2 + (f^{-1}(Y) - f^{-1}(C))^2}$$

The functions f(Y), f(M) and f(C) determine the gray balance as is illustrated in the Figure. The corresponding inverse functions $f^{-1}(Y)$, $f^{-1}(M)$ and $f^{-1}(C)$ are required for calculating the gray weighting signal.

The color signals which are obtained for the gray area and for the colored area are combined using the gray weighting signal according to the following equations which are valid for the chromatic colors and are $$Y = \Delta Y_f + (1-\Delta)Y_g$$

$$M = \Delta M_f + (1-\Delta)M_g$$

$$C = \Delta C_f + (1-\Delta)C_g$$

valid for black is:

$$K = \Delta K_f + (1-\Delta)K_g$$

The values $Y_f$, $M_f$ and $C_f$ are calculated according to the equations for the reduction in the chromatic area and are different depending upon whether the printing ink signal is a mean or a minimum signal according to the foregoing equations for minimum, mean and maximum signal values.

By discriminating according to the chromatic and gray area, the color reduction in the two areas can be differently set depending upon the quality of the employed master and the desired result in the reproduction. Also, the color reduction in the gray area can be differently set in dark, mean and bright gray tones and the factor $S_g$ is varied as a function of the brightness.

The unit of measure RP percentage in other words, dot size of a leaftone dot specified in FIG. 1 for the percent dot area represents a unit of measure which is standard in offset printing. Other units of measure are standard for other printing methods, for example, rotogravure is calculated in density but this does not result in any significant variations for the validity of the equations.

Figure 2:
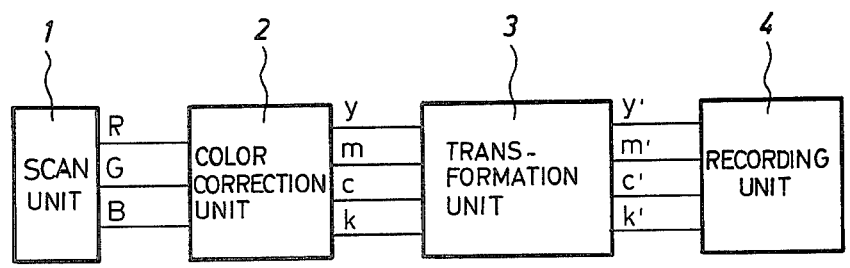
FIG. 2 is a block diagram of the scanning and color reduction system.

FIG. 2 shows a block diagram for the scanning and color reduction unit. The scan unit 1 is a commercially available scanner as it is described in the U.S. Pat. No. 3,725,574. Such scanners comprise a scanning drum, for scanning the master, a color correction unit 2 and a recording unit 4. The recording unit 4 comprises a raster generator and a recording system by which the color separations are recorded on a photosensitive film, which is mounted on a recording drum as described in FIGS. 1 and 3 of U.S. Pat. No. 3,725,574. According to the present invention, there is provided a transformation unit 3 between the color correction unit 2 and the recording unit 4 in which the color reduction is performed.

The realization of the color cancellations according to the listed equations can be practically executed in the transformation unit 3 in different means. One skilled in the art can use standard means such as simulation of the equations by means of commercially available analog circuits which are available and are supplied by semiconductor companies. It should also be noted that with today's state of the art, the performance of the computational operations required in the equations can be done by means of commercially available adders, multipliers and this presents no difficulty whatsoever for those skilled in the art. It is also possible to calculate the operation in advance by using a digital computer for example such as a microcomputer and then to supply these input into a tabular store for the implementation of the actual color reduction.

The modified color reduction according to the invention then results in a manner such that the master can be opto-electronically scanned with the known scanner 1 and the colors Y, M, C thus obtained can be converted into the printing ink signal by using the tabular store which contains the color signals before the color removal to the color signals after the colored removal and the color separations being produced using the printing ink signals. Such apparatuses are disclosed, for example, in German LP No. 10 53 311 which corresponds to U.S. Pat. No. 2,993,087 and German OS No. 28 10 225 which corresponds to U.K.L.P. No. 2,016,238 which disclosure is hereby incorporated by reference in this application.

The employment of a tabular store is particularly advantageous since such store can be easily reloaded for a different setting for the color removal and even during reproduction and the signals arising during the image scanning can be converted into the corresponding printing ink signals at high speed using the tabular store.

The invention can be utilized in the printing technology and polychromatic printing.

Although the invention has been described with respect to preferred embodiments, it is not to be so limited as changes and modifications can be made which are within the full intended scope of the invention as defined by the appended claims.

We claim as our invention:

1. A method for reproduction of colored masters for four-color printing in which the color master having chromatic and gray areas is trichromatically scanned and color measured value signals R, G, B thus obtained are converted into printing ink signals yellow (Y), magenta (M), cyan (C) and black (K), forming a color spacer with a gray line and which are used for the production of color separations for the printing inks magenta (M), cyan (C) and black (K) employed for the four-color printing, wherein a color reduction is done, comprising the steps of distinguishing between gray areas and chromatic areas of the master, making a color reduction in the gray area in which a gray balance corresponding to the three printing ink signals yellow (Y), magenta (M) and cyan (C) is utilized and making a color reduction in the chromatic area of the master which is matched to the respective maximum, mean or minimum value of the three printing ink signals yellow (Y), magenta (M) and cyan (C).

2. A method according to claim 1, wherein in the gray areas, the printing ink signal for black (K) is derived from cyan (C).

3. A method according to claim 1 wherein a smooth transition of the color reduction is made in a transition area between the gray area and chromatic area, with a progression from the characteristic of the gray area to the characteristic of the chromatic area.

4. A method according to claim 1 wherein the color reduction in the gray area is made according to the following equations $$K_g = f^{-1}(C_3)S_g$$

$$Y_g = Y_3(1-S_g)$$

$$M_g = M_3(1-S_g)$$

$$C_g = C_3(1-S_g)$$

where $S_g$ is the measurement for the color reduction for the gray area with $0 \leq S_g \leq 1$, $Y_3$, $M_3$ $C_3$ are the printing ink signals of the three chromatic colors yellow, magenta and cyan without color reduction, and $K_g$, $Y_g$, $M_g$ and $C_g$ are the printing ink signals black (k), yellow (Y), magenta (M) and cyan (C) after the color reduction for the gray area, and $f^{-1}(C_3)$ is the inverse function of $C_3 = f(K)$.

5. A method according to claim 1 characterized in that, for the color reduction in the chromatic area, the printing ink signals are calculated according to the following equations:

$$K_f = a_K D_{3,min}$$

$$D_{4,min} = a_{min} D_{3,min}$$

$$D_{4,mean} = a_{mean} D_{3,mean}$$

$$D_{4,max} = a_{max} D_{3,max}$$

where $D_{3,min}$, $D_{3,mean}$ and $D_{3,max}$ are respectively the minimum, mean and maximum signal of a color triplet of the printing ink signals yellow (Y), magenta (M) and cyan (C) before the color reduction, $a_K$, $a_{min}$, $a_{mean}$ and $a_{max}$ represent evaluation factors, $K_f$ represents the printing ink signal for the black color separation, and $D_{4,min}$, $D_{4,mean}$ and $D_{4,max}$ represent the printing ink signals after the color reduction for the three chromatic colors Y, M, C and whereby the factors $a_K$, $a_{min}$, $a_{mean}$ and $a_{max}$ are determined, for example according to the following equations:

$$a_K = b_1 S_f$$
$$a_{max} = 1$$
$$a_{mean} = 1 - S_f[b_2 \{\alpha_3 (D_{3,max} - D_{3,mean})\}_1]$$
$$a_{min} = 1 - S_1[b_3 \{\alpha_1 (D_{3,max} - D_{3,min})\}_1 + b_4 \{\alpha_2 (d_{3,mean} - D_{3,min})\}_1]$$

where $S_f$ is the value for the color reduction in the chromatic area and $0 \leq S_f \leq 1$, $S_f = 0$ represents no color reduction and $S_f = 1$ represents full color reduction and the index $\{\ldots\}_1$ represents the limitation of the brackets to 1, $\alpha_1, \alpha_2$ and $\alpha_3$ are constants which fix the size of the transition area for the progression between $D_{3,max}$ and $D_{3,min}$ or, respectively, $D_{3,mean}$ and $D_{3,min}$, and $D_{3,max}$ and $D_{3,mean}$, and the factors $b_1$–$b_4$ are values for the maximum degree of the respective reduction.

6. A method according to claim 1 wherein the progression of the color reduction between gray area and chromatic area is done according to a gray weighting signal which is derived from the spacing of the respective color location from the gray line of the color space and is calculated according to the following equations:

$$\Delta = \{B.\delta\}_1$$

whereby $\Delta$ denotes the gray weighting signal, B is a magnitude for the termination of the transition between the gray area and the chromatic area $\delta$ specifies the spacing of the respective color location from the gray line, and $\{\ldots\}_1$ denotes the limitation of the bracketed value to "1", where the calculation is carried out according to the equation $$\delta = \sqrt{(f^{-1}(C) - f^{-1}(M))^2 + (f^{-1}(M) - f^{-1}(Y))^2 + (f^{-1}(Y) - f^{-1}(C))^2}$$

for the consideration of the respective gray balance, and $f^{-1}(Y)$, $f^{-1}(M)$ and $f^{-1}(C)$ are the inverse functions of the functions of the functions of the gray balance.

7. A method according to claims 4, 5 and 6, wherein after consideration of the color reduction in the gray area and in the chromatic area as well as in the transition area between gray area and chromatic area, the printing ink signals are calculated according to the following equations:

$$Y = \Delta Y_f + (-\Delta)Y_g$$

$$M = \Delta M_f + (1-\Delta)M_g$$

$$C = \Delta C_f + (1-\Delta)C_g$$

$$K = \Delta K_f + (1-\Delta)K_g$$

where the values $Y_f$, $M_f$, $C_f$ are calculated according to the equations of claim 4 for the chromatic area, and are different depending upon whether the printing ink signals are, respectively, the minimum, mean or maximum signals.

8. A method according to claim 1 wherein the printing ink signals for the color reduction are placed into a tabular store after the calculation of a specific color reduction.

9. A method according to claim 1 wherein the degree of the color reduction in the gray area is differently set in dark, mean and bright gray tones in dependence of a function of brightness of the master.

* * * * *